April 28, 1970  H. C. SPRAGUE, SR  3,508,590
CUTTING GUIDE FOR SAWS
Filed Dec. 15, 1967  2 Sheets-Sheet 1
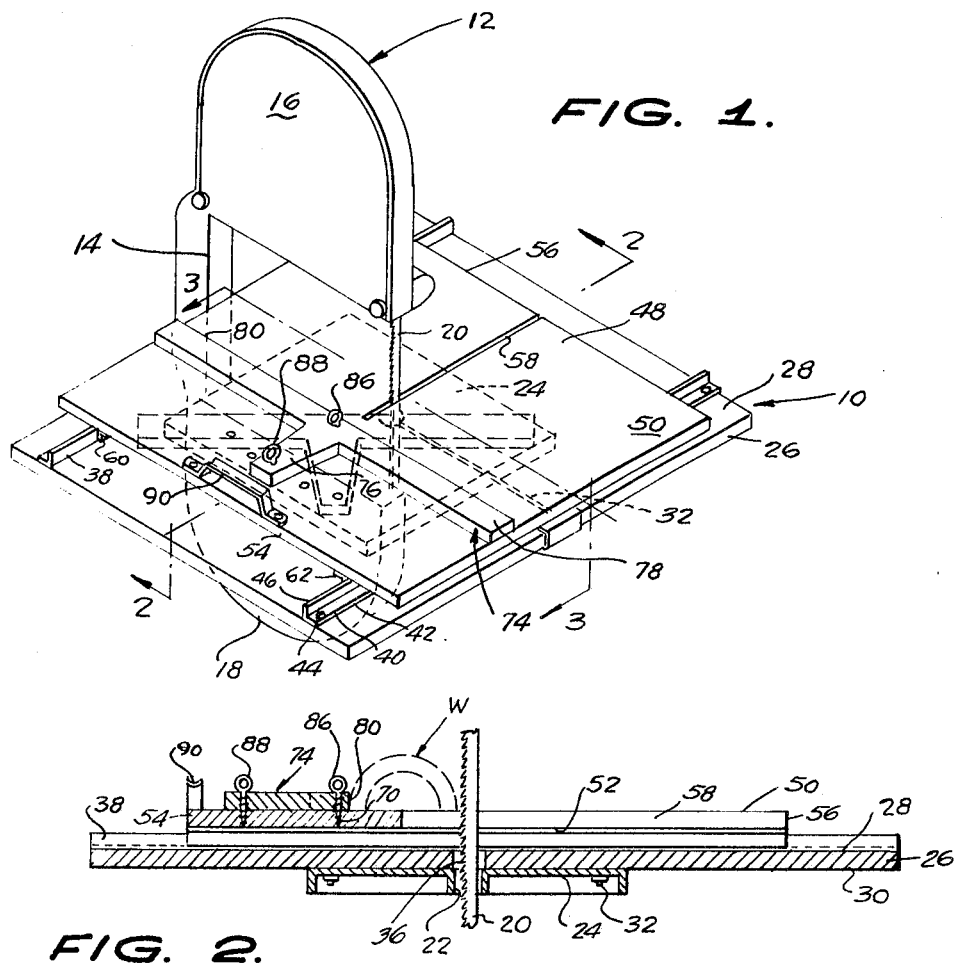
FIG. 1.
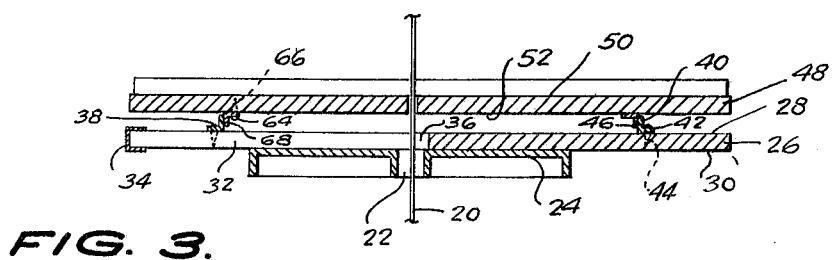
FIG. 2.
FIG. 3.
INVENTOR.
HARRY C. SPRAGUE, SR.
BY
Robert G. McMorrow
ATTORNEY.

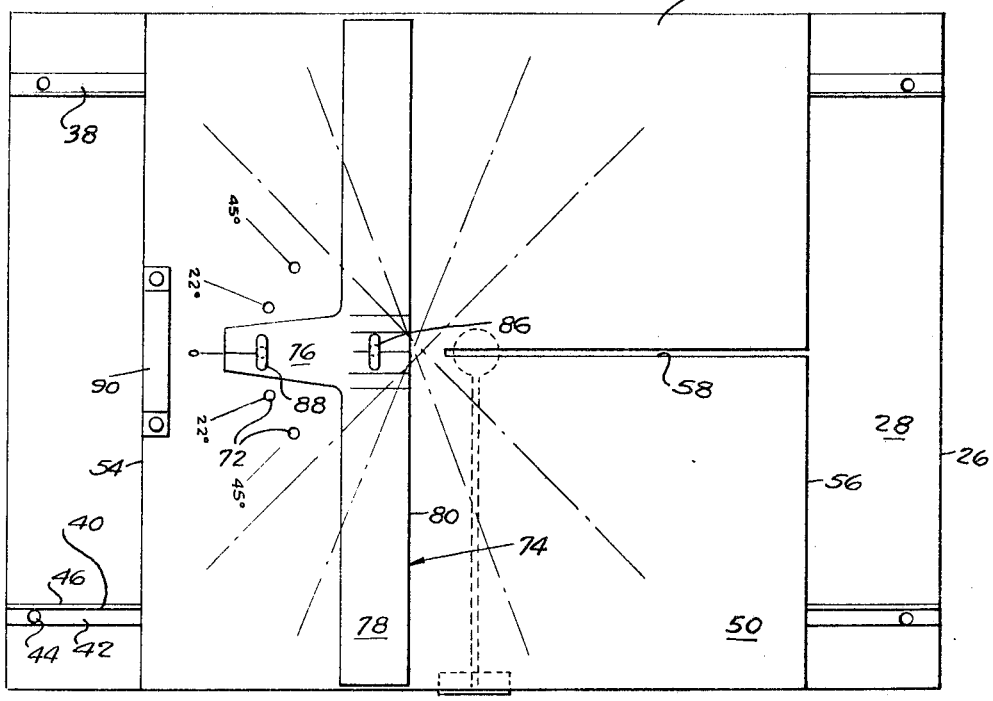
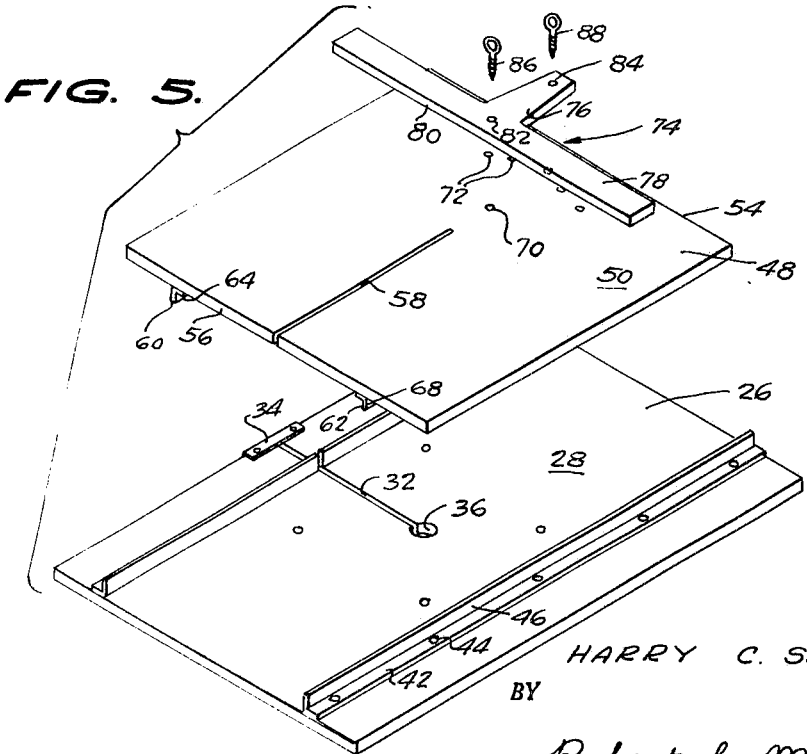

United States Patent Office 3,508,590
Patented Apr. 28, 1970

3,508,590
CUTTING GUIDE FOR SAWS
Harry C. Sprague, Sr., 3036 Duke St.,
Baton Rouge, La. 70805
Filed Dec. 15, 1967, Ser. No. 690,874
Int. Cl. B27b 13/00; B23d 55/04
U.S. Cl. 143—25                                    3 Claims

ABSTRACT OF THE DISCLOSURE

A guide for making linear cuts in materials of irregular form, the guide being used in conjunction with a saw, and having a fixed support and a movable support with an angularly adjustable work contact guide on the movable support.

BACKGROUND OF THE INVENTION

Field of the invention

This invention pertains to a work positioning guide used in conjunction with a saw or like cutting device, and more specifically to a guide for making substantially straight cuts in materials of irregular form.

Description of the prior art

Various means have heretofore been proposed for control of the angle of cut of material as the material is fed into a cutting device. Examples of these previous proposals are found in the following patents:

Petersen 2,363,745, Nov. 28, 1944; McEwan et al. 2,857,943, Oct. 28, 1958; DeWitt 3,057,240, Oct. 9, 1962; Schultz 3,138,180, June 23, 1964.

These previously known devices, while constituting improvements over hand gauging, do not lend themselves to straight angular severance of materials of irregular or uneven form such as pipe insulation halves, and related objects which must be cut at pre-determined, fixed angles in order to be correctly joined to meeting sections thereof.

SUMMARY OF THE INVENTION

The present invention relates to a saw guide for cutting irregular forms such as insulation materials, and has as a basic objective thereof the cutting of straight angles on such materials with consistent accuracy of cut and without the necessity for complex, difficult to apply clamps or the like.

In the handling of pipe insulation of the type constructed of plastic, cork, and similar materials, the insulation is generally of the outline form of the piping system, and therefore includes not only straight sections, but valve covers, L-shaped and T-shaped corner and end sections, cross-over sections and others. The insulation elements are supplied in halves, and are affixed about the corresponding portions of pipe systems in a known manner. However, in designing an insulation layout for a particular pipe system, it is necessary that the various element halves be cut to fit tightly against an adjacent section half. This cutting operation is customarily performed on a band saw or the like.

The angular terminal edges of the elements must normally be cut at given, pre-determined angles, such as 45°, 22½°, etc. The present invention provides a means for the initial orientation of the work piece to the saw blade at such angle, and means for maintaining this orientations through the completion of the cutting operation. A related objective of the invention resides in the provision of guide means of the character indicated in which the angular location of the work piece is positively determinable, and wherein the likelihood of misalignment as often occurs in device dependent solely on visual positioning is minimized.

Still another object of this invention is to provide a saw guide and work holder of safe operating capability, lessening the possibility of accident in the use of a band saw or the like.

Other and further objects and advantages of the invention will become apparent to those skilled in the art from a consideration of the following specification when read in conjunction with the annexed drawings.

BRIEF DESCRIPTION OF THE DRAWINGS

FIGURE 1 is a perspective view showing a band saw with a cutting guide constructed and assembled in accordance with the teachings of this invention in place thereon;

FIGURE 2 is an enlarged, sectional view taken substantially on the line 2—2 of FIGURE 1, looking in the direction of the arrow;

FIGURE 3 is a medial cross-section on the line 3—3 of FIGURE 1, looking in the direction of the arrows;

FIGURE 4 is an enlarged top plan view; and

FIGURE 5 is a disassembled perspective view of the guide.

DESCRIPTION OF THE PREFERRED EMBODIMENT

Referring to the drawings in greater detail, the apparatus of the present invention is shown in a typical environment of use in FIGURT 1. There the apparatus 10 is operatively associated with a cutting device 12 in the form of a band saw. Such devices include a frame structure 14 with housings 16 and 18 for a continuous blade 20. The blade 20 extends through a central opening 22 in a saw table 24.

The guide assembly apparatus 10 of the present invention first comprises a substantially flat, rectangular fixed support 26 formed of wood or other suitable material and having a top side 28 and an opposite bottom side 30. The fixed support is connected, releasably if desired, to the saw table 24 by changeable fasteners 32 such as nut and bolt means. Mounting and dismouting of the support is facilitated by a slot 32 through which the blade may be passed, and which is closed at its outer end by a clamp 34. The slot terminates at its inner end in a circular opening 36 through which the blade is exposed in its operating position.

Mounted on the top side 28 of the fixed support 26 is a pair of rail members 38, 40. The rail members are spaced apart in substantially parallel relationship to one another, and extend in the direction of cutting alignment of the blade. Each of said rail members comprises a foot portion 42 secured to the support by screws 44 or the like, and an upstanding leg portion 46. The leg portions 46 face one another and are disposed inboard of the foot portions 42.

As seen to best advantage in FIGURE 4, a second important component of the invention comprises a movable support 48. The support 48 has an upper side 50, lower side 52, and forward and rear ends 54, 56, respectively. A medial slot 58 extends inwardly from the rear end 56 and the slot is of a width such that the blade 20 of the saw is freely operable therein. It will be observed in FIGURE 4 that the movable support is of a length from end to end substantially shorter than the corresponding dimension of the fixed support. To permit the movement of the movable support relative to the fixed support, the former has guide track means depending from its lower side 52. This means comprises a pair of laterally spaced, parallel tracks 60, 62 each having an elongated arm portion 64 secured to the bottom side by screws 66, and a vertical, elongated track element 68. The track elements are positioned outward of the arm portions, and are located for contact with the upstanding leg portions of the rail members. Thus, the movable support is slidable in a straight line relation to the fixed support.

A first aperture 70 is formed in the movable support in longitudinal alignment with the slot 58. The group of second apertures 72 are also formed in the movable support and are arranged in an arc spaced inwardly from the first aperture and adjacent the forward end 54. This arc of disposition of the second apertures has, as its center of radius, the first aperture 70.

The invention 10 further comprises a work contact means including a generally T-shaped cutting guide 74. The guide 74 includes a stem 76 and a work contacting, elongated cross bar 78. The cross bar has a straight leading edge 80 and has a central opening 82 formed therein at a point aligned in use with the blade 20. The stem has an opening 84 spaced from the cross bar opening and in longitudinal alignment therewith. Suitable screw or pin means, such as the eye screws 86, 88 shown in the drawings, extend through the cross bar and into the stem openings. The screw 86 is located in the first opening 70 of the movable support, while the screw 88 extends through the stem opening 84 and into any selected one of the second openings 72.

If desired, an operating handle 90 may be supplied on the forward end 54 of the movable support.

In the operation of this invention, the desired angle of cut of a workpiece W is first determined. The work contacting guide 74 is then set at that desired angle, and the setting of the guide may be shown by visible indicia in the manner indicated in FIGURE 4 of the drawing. The screw 88 is employed to maintain the selected angularity of the guide, and the movable support is pushed in the direction of the blade 20 thereby forcing the workpiece W against the blade with a consequent severance of the workpiece at the desired angle.

Having described and illustrated an embodiment of this invention in some detail, it will be understood that this description and illustration have been offered only by way of example, and that the invention is to be limited in scope only by the appended claims.

I claim:

1. The combination, with a band saw of the type having a continuous, thin blade and having a saw table with an opening therein through which the blade is continuously passed in a cutting operation, of a guide for making straight angular cuts in articles of irregular form, comprising:
    a substantially flat, rectangular fixed support, having a top side and a bottom side, releasably connected to the saw table;
    the fixed support having a blade opening therein to permit the blade to pass therethrough, and having a slot communicating with the blade opening to permit the application of the fixed support to the saw table without disassembly of the saw;
    a plurality of changeable fastening means for the connection of the fixed support to the saw table;
    a pair of rail members secured on the fixed support in laterally spaced, parallel relation, the rail members each being of L-shaped cross section including a foot portion affixed to the top side of the fixed support, and an upstanding, elongated leg portion;
    a movable support of substantially rectangular, flat form, having an opposite upper and lower sides and forward and rear ends;
    the movable support having a medial slot therein extending from its rear end and permitting movement of the movable support with respect to the blade;
    guide track means depending from the lower side of the movable support, comprising a pair of spaced track members of L-shaped section each having an arm portion secured to the lower side and a vertical, elongated track;
    the tracks of the movable support being engaged with the leg portions of the fixed support to insure straight line movement of the movable support with respect to the fixed support;
    the movable support having a first aperture therein aligned with the medial slot, and having a group of second apertures arranged in an arc spaced from the first aperture, the arc of the second aperture having the first aperture as its center;
    a T-shaped cutting guide for holding said article in a position to contact the blade at a predetermined angle, the cutting guide including a stem portion and a work contacting cross bar;
    the cross bar having a central opening formed therein and having a pivot screw extending through said second opening and into the first aperture; and
    the stem portion having an opening therein remote from the cross bar opening, with a positioning screw therein engageable in any selected one of said second apertures.

2. In combination, with a band saw of the type having a continuous thin blade and having a saw table with an opening therein through which the blade is continuously passed in a cutting operation the improvement comprising a guide for making straight angular cuts in articles of irregular form, said guide comprising:
    a substantially flat fixed support coupled to said saw table;
    said support having a blade opening therein to permit the blade to pass therethrough;
    spaced parallel rail members secured to the top side of the fixed support;
    a movable, generally flat support carry guide members for contact with said rail members on the bottom side thereof; a medial slot carried by said movable support and extending from its one end inwardly to permit movement of the movable support with respect to the blade;
    the movable support having a first aperture therein aligned with the medial slot and having a group of second apertures arranged in an arc spaced from the first aperture with the arc of the second apertures employing the first aperture as its center of rotation;
    a T-shaped cutting guide for holding an article in position to contact the blade at a predetermined angle, the cutting guide including a stem portion and a work contacting cross bar;
    the cross bar having a central opening formed therein at the intersection of the center lines of said cross bar and said stem portion;
    means defining a pivotable coupling at the point where said central opening coincides axially with said first aperture; and means carried by said stem portion and extending downwardly therefrom for selective engagement with any one of said second apertures.

3. The guide as claimed in claim 2 wherein said means for pivoting said cross bar to said movable support comprises a removable pivot screw extending through said central opening and into said first aperture and said means extending downwardly from the stem portion of said T-shaped cutting guide and selectively positionable within one of said second apertures, comprising a positioning screw.

References Cited

UNITED STATES PATENTS

| 1,886,321 | 11/1932 | Walker | 143—25 |
| 2,315,458 | 3/1943 | Sellmeyer | 143—169 |
| 2,606,580 | 8/1952 | Johnson | 143—25 X |

ANDREW R. JUHASZ, Primary Examiner

J. F. COAN, Assistant Examiner

U.S. Cl. X.R.

83—201; 143—169